United States Patent
Tomisawa et al.

[11] Patent Number: 5,815,827
[45] Date of Patent: Sep. 29, 1998

[54] CRANK ANGLE SIGNAL PROCESSING APPARATUS

[75] Inventors: Naoki Tomisawa; Satoru Watanabe, both of Atsugi, Japan

[73] Assignee: Unisia Jecs Corporation, Kanagawa-ken, Japan

[21] Appl. No.: 640,384

[22] Filed: Apr. 30, 1996

[30] Foreign Application Priority Data

May 15, 1995 [JP] Japan .................................... 7-115499

[51] Int. Cl.⁶ .............................. G05B 15/00; G06F 9/46
[52] U.S. Cl. ...................... 701/101; 701/107; 701/110; 123/612; 123/618
[58] Field of Search .................................... 701/101, 102, 701/105, 107, 110, 29, 35; 123/179.5, 612, 623, 618, 626, 630

[56] References Cited

U.S. PATENT DOCUMENTS

| | | | |
|---|---|---|---|
| 3,926,557 | 12/1975 | Callies et al. | 123/606 |
| 3,941,110 | 3/1976 | Sekiguchi | 123/599 |
| 4,442,820 | 4/1984 | Ina et al. | 701/108 |
| 4,502,446 | 3/1985 | Kanegae et al. | 123/479 |
| 4,558,417 | 12/1985 | Akiyama et al. | 701/114 |
| 4,970,668 | 11/1990 | Satoh et al. | 701/102 |
| 5,165,380 | 11/1992 | Okamura | 123/613 |

*Primary Examiner*—Tan Q. Nguyen
*Attorney, Agent, or Firm*—McDermott, Will & Emery

[57] ABSTRACT

The present invention relates to a circuit for processing internal combustion engine crank angle sensor signals. The construction is such that an output side circuit of a crank angle sensor outputs a crank angle signal with a high level pulse generated in response to the switching on and off of a switch element connected in series to a power source. Moreover, an input side circuit of a signal processing circuit includes a voltage reducing circuit which pulls down a power source voltage applied at the time of pulse generation, to a predetermined voltage and supplies this to an arithmetic processing section. Consequently, the output signal at the time of no pulse generation becomes a low level so that influence from noise is minimized. Also, since the input signal at the time of momentary disconnection of terminals connecting between the crank angle sensor and the processing circuit is a low level, then erroneous recognition of pulse generation is prevented. Moreover, since at the time of pulse generation, current flows between the terminals, then terminal oxidation film is removed so that poor contact can also be prevented.

8 Claims, 1 Drawing Sheet

CRANK ANGLE SIGNAL PROCESSING APPARATUS

BACKGROUND OF THE INVENTION

1. Field of the Invention

The present invention relates to an apparatus for processing signals from a crank angle sensor of an internal combustion engine.

2. Description of the Related Art

With electronically controlled internal combustion engines, a crank angle sensor is provided which outputs a crank angle signal generating a pulse for each predetermined crank angle. The signal from the crank angle sensor is then processed in order to carry out engine rotational speed detection, and electronic control of the ignition timing, fuel injection period and the like.

The crank angle sensor and the processing circuit (control unit) for processing the signal from the crank angle sensor are connected via a signal lead (harness). For example, with a first example of a circuit construction of a conventional crank angle signal processing apparatus, a collector of an emitter earthed transistor of an output side circuit of the crank angle sensor, is connected to an output terminal Ocs, and the output terminal Ocs and an input terminal Icu of a control unit are connected via a harness. The input terminal Icu is connected via a resistor to a constant voltage power source VCC (for example 5 V) inside the control unit, and the potential of the input terminal Icu is input to a CPU which carries out arithmetic processing.

Protrusions are formed for each predetermined crank angle (for example each 1° for a unit crank angle signal, or each crank angle corresponding to a stroke phase difference between the cylinders (ie. for each 180 degrees with a four cylinder engine) for a reference crank angle signal), on an outer peripheral portion of a rotation body connected to a crank shaft, cam shaft or the like, while a pickup is provided close to the outside of the protrusions. Each time the protrusions pass the pickup with rotation of the engine, a low level pulse is input to the base of the transistor, so that the transistor goes OFF, causing a high level pulse pulled up to the voltage of the constant voltage power source VCC, which is then input to the CPU for arithmetic processing.

With this type of crank angle signal processing apparatus, there are the following three basic requirements.

(1) Resistance to noise Impedance at the time of no pulse generation in the output signal from the crank angle sensor should be as low as possible to minimize noise overlay.

(2) Resistance to momentary disconnection Erroneous operation of the processing circuit at the time of momentary disconnection of the signal harness connectors and the like should be unlikely.

(3) Maintenance of terminal current Removal of terminal electrode film which is the source of poor contact should be possible by passing a current through the contact terminals connected to the signal harness.

With the conventional crank angle signal processing apparatus, the transistor comes ON at the time of no pulse generation in the crank angle signal, and the signal output from the crank angle sensor becomes a low level. Hence the resistance to noise requirement (1) is satisfied.

Furthermore, at this time, since a current flows from the control unit side to the crank angle sensor side, from the input terminal Icu of the control unit via the harness and the output terminal Ocs of the crank angle sensor, then the terminal current is maintained and hence requirement (3) is also satisfied.

However, at the time of momentary disconnection of the harness or the like, the potential of the input terminal Icu is pulled up to the voltage of the constant voltage power source VCC, and thus becomes a high level, which is erroneously recognized as a pulse generation of the crank angle signal. There is thus the possibility of erroneous processing, and hence the resistance to momentary disconnection requirement (2) is not satisfied.

As a second conventional example, a construction is possible wherein the resistor connected between the constant voltage power source VCC on the control unit side and the collector of the transistor on the crank angle sensor side, is provided on the crank angle sensor side, and an output terminal Ocu on the control unit side and an input terminal Ics on the crank angle sensor side are connected via a harness. The potential of the collector of the transistor connected to the resistor is then input via a harness from an output terminal Ocs to an input terminal Icu of the control unit, as an output signal from the crank angle sensor, and subjected to arithmetic processing in the CPU.

With this arrangement, as with the beforementioned circuit, the crank angle signal at the time of no pulse generation becomes a low level and hence the resistance to noise requirement (1) is satisfied. Moreover, due to the resistor being on the crank angle sensor side, then at the time of momentary disconnection, the signal is not pulled up to the voltage of the constant voltage power source VCC, but instead drops to a low level. Therefore there is no erroneous recognition of pulse generation, and hence the resistance to momentary disconnection requirement (2) is also satisfied.

However at the time of no pulse generation, there is no current flow between the output terminal Ocs on the crank angle sensor side and the input terminal Icu on the control unit side. That is to say, requirement (3) is not satisfied. Hence it is not possible to prevent electrode film build up on the terminals so as to minimize poor contact.

In the case of a construction similar to the first conventional example, with the pulse generated in the sensor section of the crank angle sensor supplied to the base of the transistor as a high level, and the pulse from the collector output as a low level, then at the time of a momentary disconnection of the harness, the input signal becomes a high level, matching the level at the time of no pulse generation, and hence the resistance to momentary disconnection requirement (2) is satisfied. Furthermore at the time of pulse generation, the transistor is powered so that a current flows between the terminals. Hence terminal voltage is also maintained and requirement (3) is also satisfied. However the input signal during no pulse generation becomes a high level. There is thus a susceptibility to influence from noise and hence the resistance to noise requirement (1) cannot be satisfied.

Therefore, with the conventional crank angle signal processing apparatus, the abovementioned three conditions cannot be realized simultaneously.

SUMMARY OF THE INVENTION

The present invention takes into consideration such problems with the conventional arrangements with the object of being able to satisfy all of the respective basic conditions required for a crank angle signal processing apparatus, namely; the resistance to noise requirement (1), the resistance to momentary disconnection requirement (2) and the maintenance of terminal current requirement (3).

Moreover, it is an object to realise the abovementioned conditions with a simple circuit.

It is a further object to be able to meet the respective conditions even at the time of a fault in the simple circuit.

Accordingly, the apparatus for processing crank angle sensor signals according to the present invention comprises;

a crank angle sensor which outputs a crank angle signal generating a pulse for each predetermined crank angle with rotation of an internal combustion engine, and a processing circuit for processing the crank angle signal from the crank angle sensor, input thereto via a signal lead, wherein an output side circuit of the crank angle sensor includes a switch element connected in series to a power source, and outputs a crank angle signal with the pulse generated in response to the switching on and off of the switch element, and the level of the crank angle signal is a high level at the time of the pulse generation and is a low level at the time of no pulse generation, and an input side circuit of the processing circuit includes a voltage reducing circuit which is powered at the time of pulse generation and pulls down the power source voltage to a predetermined voltage and supplies this to an arithmetic processing section.

With such a construction, the switch element is switched on and off in response to pulses generated from the sensor section of the crank angle sensor for each predetermined crank angle, and a pulse is generated from a connection point between a resistor and the switch element in response to the switching, and is taken out as the crank angle signal.

The construction may be such that the crank angle signal is a high level at the time of pulse generation and is low level at the time of no pulse generation. Consequently, since this is low level at the time of no pulse generation, then the influence from noise is minimized and hence the resistance to noise requirement is satisfied.

Moreover, since at the time of a momentary disconnection in the signal lead, the processing circuit is cut-off from the power source, then a low level results so that the level does not match the high level at the time of pulse generation. Therefore erroneous recognition of pulse generation can be prevented.

Moreover, when the voltage reducing circuit is powered at the time of pulse generation of the crank angle signal, so as to pull down the power source voltage and supply this to the arithmetic processing section, the current flows from the crank angle sensor side via the signal lead to the voltage reducing circuit on the processing circuit side. A current therefore flows in the connection terminals of the signal lead, so that the build up of an oxidation film on the terminals is suppressed. Hence poor contact due to the oxidation film is controlled.

Furthermore, the construction may be such that the switch element is connected to the power source via the resistor, and a crank angle signal is taken out from the connection point between the switch element and the resistor.

In this way, when the switch element is switched ON, the crank angle signal becomes a low level, while when the switch element is switched OFF, the crank angle signal generates as a high level pulse.

Furthermore, the construction may be such that the voltage reducing circuit comprises a Zener diode with one end connected to the arithmetic processing section and the other end earthed, for controlling voltage between terminals to a predetermined voltage.

In this way, the power source voltage at the time of pulse generation of the crank angle signal is pulled down to a predetermined constant voltage determined by the Zener diode, prior to input to the arithmetic processing section for arithmetic processing.

Moreover, the construction may be such that when as described above, the voltage reducing circuit comprises a Zener diode, the construction includes a resistor connected in parallel with the Zener diode.

In this way, the power source voltage is voltage divided by the resistor connected in parallel with the Zener diode, so that in the case of a fault in the Zener diode or the like, the application of a high voltage power source voltage to the arithmetic processing section can be prevented.

Objects of the present invention will become apparent from the following description of embodiments given in conjunction with the appended drawings.

DESCRIPTION OF THE PREFERRED EMBODIMENTS

As follows is a description of embodiments of the present invention based on the drawings.

Figure 1:
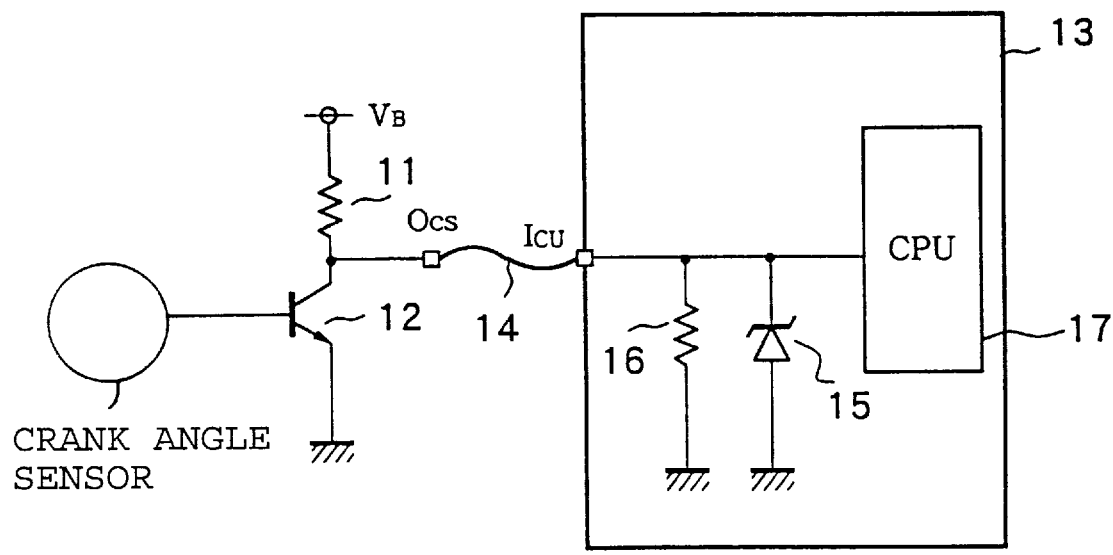
FIG. 1 is a circuit diagram showing a construction of a first embodiment of the present invention.

FIG. 1 is a circuit diagram of a crank angle signal processing apparatus according to a first embodiment of the present invention.

In FIG. 1, a sensor section (not shown) of a crank angle sensor is constructed to generate a pulse each time protrusions formed for each predetermined crank angle on an outer peripheral portion of a rotation body connected to a crank shaft, cam shaft or the like, pass a pickup provided close to the outside thereof with rotation of the engine. Alternatively a construction is possible wherein windows are formed in a peripheral rim of the rotation body at each predetermined crank angle, and a light emitting element and a light receiving element are provided on opposite sides of the rotation body with the window portion therebetween, so that light emitted from the light emitting element is received by the light receiving element for each passing of the window, to thereby generate a pulse.

An output side circuit of the crank angle sensor connected to the sensor section, as shown in FIG. 1, has a resistor 11, and a transistor 12 (switch element), connected in series to a power source (battery) $V_B$ (voltage≈12 V). An output terminal Ocs is provided so as to take out a crank angle signal from a connection point between the resistor 11 and the transistor 12.

A pulse from the sensor section is subjected for example to direct or inverse processing to give a low level pulse which is then input to the base of the transistor 12.

An input side circuit of the control unit 13 (processing circuit) is provided with an input terminal Icu which is connected via a harness 14 (signal lead) to the output terminal Ocs of the crank angle sensor, with a cathode of a Zener diode 15 serving as a voltage reducing circuit for reducing the voltage of the power source $V_B$ to a predetermined voltage (5 V), connected to the input terminal Icu, and an anode of the Zener diode 15 earthed. A resistor 16 is connected in parallel with the Zener diode 15 so that the potential of the input terminal Icu is applied to a CPU 17 (arithmetic processing section). For the resistor 16, a resistor is selected having a resistance value such that the resultant voltage of the connection point after voltage dividing the power source $V_B$ voltage (12 V) with the resistor 16 and the resistor 11 on the crank angle sensor side, is slightly higher than the voltage (5 V) determined by the Zener diode 15.

Next is a description of the operation of the apparatus of the present embodiment constructed as described above.

When the pulse generated from the sensor section for each predetermined crank angle as described above, is input in a low level condition to the base of the transistor 12, the transistor 12 becomes non-conductive.

At this time, the voltage (12 V) of the power source $V_B$ is applied to the Zener diode 15 of the input side circuit of the control unit 13 via the resistor 11 on the crank angle sensor side, and the Zener diode 15 acts on this to reduce the voltage of the cathode side, that is the voltage of the input signal, to a predetermined voltage (5 V). That is to say, the Zener diode 15 constitutes a voltage reducing circuit.

Consequently, a high level signal which is limited to a predetermined voltage (5 V), is input to the CPU 17 and subjected to arithmetic processing so as to detect engine rotational speed, ignition timing, and fuel injection period and the like.

By having the abovementioned circuit construction, then the basic three conditions required for a crank angle signal processing apparatus, namely, resistance to noise, resistance to momentary disconnection, and maintenance of terminal current, are all satisfied.

More specifically, since the construction is such that the crank angle signal becomes a high level at the time of the pulse generated for each predetermined crank angle, and becomes a low level at the time of no pulse generation, then the influence from noise at the time of no pulse generation is minimized so that noise is not erroneously recognised as pulse generation. Hence the resistance to noise requirement is satisfied.

Moreover, when momentary disconnection occurs in the connectors or the like of the harness 14, the potential of the input terminal Icu on the control unit side becomes a low level so that the level does not match the high level at the time of pulse generation. Hence there is no erroneous recognition of pulse generation, and the resistance to momentary disconnection requirement is also satisfied.

Moreover, when at the time of pulse generation of the crank angle signal, the Zener diode 15 is powered from the power source $V_B$ via the harness 14, a current flows in the connection terminals at opposite ends of the harness 14, namely the output terminal Ocs of the crank angle sensor and the input terminal Icu of the control unit 13. Therefore the oxidation film on the respective terminals can be removed by the current, so that poor connection due to this film can be prevented.

In this way, the resistance to noise and resistance to momentary disconnection requirements are satisfied. Moreover, the function of preventing poor contact using terminal current is also satisfied. Hence processing accuracy in the CPU 17, that is to say detection accuracy for the engine rotational speed, and the ignition timing and the fuel injection timing and the like, can be well maintained.

Moreover, with the present embodiment, since the resistor 16 is connected in parallel with the Zener diode 15, then in the case of a disconnection fault in the Zener diode 15 or the like, a voltage which has been voltage divided by the resistor 11 and the resistor 16 so as to be slightly higher than the voltage determined by the Zener diode 15 is applied to the CPU 17. Hence the application of the full voltage (12 V) of the power source $V_B$ can be prevented.

With the present embodiment, the power source $V_B$ is a battery. However the construction may be such that the output voltage from a battery is surge processed inside the control unit, and the voltage then connected via a harness to the resistor on the crank angle sensor side.

Figure 2:
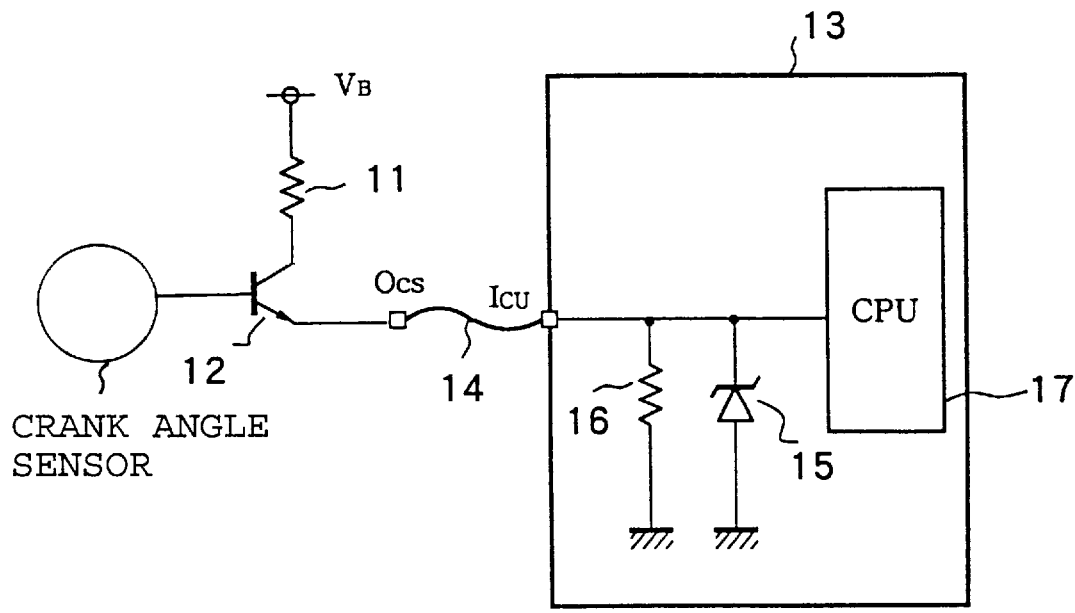
FIG. 2 is a circuit diagram showing a construction of a second embodiment of the present invention.

FIG. 2 shows a second embodiment of the present invention.

With this embodiment, the output side circuit of the crank angle sensor is constructed such that the emitter of the transistor 12 connected in series to the power source $V_B$ via the resistor 11, is not grounded as with the first embodiment, but is connected to the output terminal Ocs. The construction of the input side circuit of the control unit 13 is the same as for the first embodiment.

With the second embodiment, the construction is such that the pulse generated from the sensor section for each predetermined crank angle is input to the base of the transistor 12 as a high level.

Consequently, with the second embodiment, when the transistor 12 is powered in response to the pulse generated in the sensor section, the pulse of the crank angle signal taken out from the output terminal Ocs becomes a high level.

With the second embodiment also, since at the time of no pulse generation the crank angle signal is a low level, then the resistance to noise requirement is satisfied. Furthermore, since at the time of momentary disconnection of the harness 14 the input signal becomes a low level, then the resistance to momentary disconnection requirement is also satisfied. Moreover, since a terminal current flows when the Zener diode 15 is powered, then the function of preventing poor contact by oxidation film removal is also maintained.

Now the attachment positions for the resistor 11 and the transistor 12 in the embodiments may be reversed. Moreover, the construction may be such that the resistor 11 is connected between the input terminal Icu of the control unit and the resistor 16, and the potential of the connection point input to the CPU 17.

What is claimed is:

1. An apparatus comprising:
    a crank angle sensor which outputs a crank angle signal as a pulse which is generated for each predetermined crank angle of rotation of an internal combustion engine, and
    a processing circuit for processing the crank angle signal from said crank angle sensor, said crank angle sensor being connected to said processing circuit via a signal lead,
    wherein an output side circuit of said crank angle sensor includes a switch element which is connected in series with a power source, and which outputs the crank angle signal pulse in response to the switching on and off of the switch element, wherein the level of said crank angle signal is high during the pulse generation and is low level when pulse is absent, and
    wherein an input side circuit of said processing circuit includes a voltage reducing circuit which, during the pulse generation, pulls down a voltage of the power source to a predetermined voltage and supplies this predetermined voltage to an arithmetic processing section and which simultaneously allows electrical current to flow through the signal lead and prevent the formation of oxidation film on terminals at both ends of the signal lead.

2. An apparatus according to claim 1, wherein said switch element is connected to said power source via a resistor, and wherein the crank angle signal is taken out from a connection point between the switch element and the resistor.

3. An apparatus according to claim 1, wherein said voltage reducing circuit comprises a Zener diode with one end connected to a terminal of the arithmetic processing section and the other end earthed, for controlling a voltage applied to the terminal of the arithmetic processing section to a predetermined voltage.

4. An apparatus according to claim 3, further comprising a resistor connected in parallel with said Zener diode.

5. An apparatus comprising:
   a crank angle sensor which outputs a pulse for each predetermined crank angle of rotation of an internal combustion engine,
   a processing circuit,
   a signal lead electrically interconnecting said crank angle sensor and said processing circuit, said signal lead having a first terminal at a first end that is connected to said crank angle sensor, and a second terminal at a second end that is connected to said processing circuit,
   a switch element, said switch element being responsive to the pulse produced by the crank angle sensor for controlling the supply of electrical power from a power source to the first terminal of said signal lead, and
   an input circuit interposed between the second terminal of said signal lead and said processing circuit, said input circuit pulling down a voltage of the power source to a predetermined voltage when electrical power from the power source is supplied by said switch element, and supplying this predetermined voltage to said processing circuit, said processing circuit simultaneously permitting electrical current to flow through said signal lead to prevent the formation of oxide film on the first and second terminals.

6. An apparatus according to claim 5, wherein said input circuit comprises:
   a line interconnecting the second terminal of said signal lead and an input terminal of said processing circuit,
   a resistor connected between ground and said line, and
   a Zener diode connected between ground and said line.

7. An apparatus according to claim 5, wherein said switching element comprises a transistor which is connected between the power source and ground and which is rendered non-conductive in response to the pulse from said crank angle sensor, and wherein a resistor is connected in series between said power source and said transistor and wherein said first terminal is connected between the resistor and the transistor.

8. An apparatus according to claim 5, wherein said switch element comprises a transistor which is connected in series between said source of power and said first terminal and which is rendered conductive by the pulse from said crank angle sensor.

* * * * *